United States Patent [19]

Farr

[11] 4,011,540
[45] Mar. 8, 1977

[54] COMBINED ELECTRET HYDROPHONE AND TRANSMISSION LINE

[75] Inventor: John B. Farr, Houston, Tex.

[73] Assignee: Standard Oil Company (Indiana), Chicago, Ill.

[22] Filed: Jan. 22, 1976

[21] Appl. No.: 651,668

[52] U.S. Cl. .......................... 340/7 R; 174/101.5; 340/3 T; 340/15.5 TS; 325/7; 179/15 BL
[51] Int. Cl.² .......................................... G01V 1/38
[58] Field of Search ........... 340/7 R, 3 T, 15.5 TS; 174/101.5, 111 E, 110 FC, 70 R; 325/1, 7, 28; 179/15 BL, 15 BM

[56] References Cited

UNITED STATES PATENTS

| | | | |
|---|---|---|---|
| 3,239,803 | 3/1966 | Godbey | 340/15.5 TS |
| 3,748,638 | 7/1973 | Montgomery, Jr. | 340/15.5 TS |
| 3,763,482 | 10/1973 | Burney et al. | 179/111 E |
| 3,831,162 | 8/1974 | Armstrong | 340/16 R |
| 3,889,230 | 6/1975 | Knott | 340/7 R |
| 3,958,216 | 5/1976 | Chapman | 340/15.5 TS |
| 3,978,446 | 8/1976 | Miller | 340/7 R |

Primary Examiner—Howard A. Birmiel
Attorney, Agent, or Firm—Albert C. Metrailer; Arthur McIlroy

[57] ABSTRACT

A continuous line hydrophone comprising a plurality of coaxial cable segments coupled by electronic circuit modules wherein the coaxial cable serves the functions of seismic detector, signal transmission line, and DC power supply line. In the preferred embodiment, the coaxial cable is sensitized to seismic energy by having the inter-electrode dielectric permanently polarized so that it becomes an electret. An electronic circuit module at the end of a coaxial cable segment responds to seismic frequency signals produced in the coaxial cable by acoustic waves to generate a frequency-modulated carrier wave which is coupled to the next coaxial cable segment for transmission toward a tape recorder. The electronic module also retransmits any carrier wave signals which it receives from cables from distant from the recorder. The electronic circuit means additionally allows DC power to be coupled from the recorder end of the cable to more distant electronic circuits.

13 Claims, 3 Drawing Figures

COMBINED ELECTRET HYDROPHONE AND TRANSMISSION LINE

BACKGROUND OF THE INVENTION

This invention relates to a linear array of continuous line hydrophones and, more particularly, to improved means for coupling continuous line hydrophone outputs to a data recording system.

In the field of seismic signal detection, it has long been recognized that a linear array of detectors having a length greater than one wavelength provides a directional response and thereby cancels undesired seismic signals. It has also long been recognized that a continuous line detector or hydrophone is the ultimate linear detector and that a hydrophone comprising a plurality of discrete detectors is at best only an approximation of such a continuous line detector. These facts were disclosed in U.S. Pat. No. 1,584,613, issued to D. F. Comstock, et al., for a Wave Detector, on May 11, 1926. The Comstock patent disclosed variable resistance, magnetic and electrostatic line hydrophones. The Comstock patent also disclosed in its last paragraph that a "self-activity" effect had been observed.

This self-activity effect is believed to be essentially the same as the response disclosed in U.S. Pat. No. 3,763,482, issued to C. F. Burney, et al., for a Coaxial Cable Transducer, on Oct. 2, 1973. In the Burney disclosure, a coaxial cable dielectric is permanently polarized by being heated and then cooled while being subjected to a high-voltage DC potential. As Burney discloses, this permanently polarized dielectric is commonly known as an "electret" and has been known since the early 1920s. Modern thermosetting plastics, which have long charge lives, have only recently made it practical to manufacture electret transducers.

Modern seismic prospecting systems typically include a plurality of seismometer groups or arrays arranged in a line or spread. In marine seismic prospecting systems, groups of hydrophones are assembled in a cable and the entire assembly forms a streamer which is towed behind a ship which carries recording equipment. Each group is large enough to provide the surface wave cancellation effect disclosed in the Comstock patent. The use of a large number of these groups allows the seismic inspection of a larger area, as well as providing many other improvements in the quality of data acquired. It has been common practice to interconnect the plurality of groups to recording equipment by means of a multiconductor cable running from the recorders to all of the groups. These cables have become quite large, complex, and expensive, as the number of groups has been increased and the surface coverage has been extended to the range of one mile. A U.S. Pat. No. 3,781,778, issued to Sawin, et al., on Dec. 25, 1973, for a Marine Streamer Cable, discloses a new configuration of a cable of this type.

Some of the problems associated with the use of multiconductor cables in seismic exploration were recognized in and solved by the U.S. Pat. No. 3,239,803, issued to J. J. Godbey, on Mar. 8, 1966, for a Variable Capacitance Geophone Assembly for Seismic Prospecting. Godbey's disclosure solves the multiconductor cable problems by providing a geophone which generates a carrier wave signal which is frequency-modulated by acoustic waves which impinge upon the geophones. Each geophone operates at a separate center frequency so that all the signals from a plurality of geophones may be coupled onto a single transmission line, such as coaxial cable. At the recorder end of the cable, electronic circuitry separates the signals according to frequency so that each geophone output is separately recorded, even though all are transmitted simultaneously over a single two-conductor cable.

Thus, it is seen that various continuous line geophones have been known and used and that methods of transmitting a plurality of geophone signals on a simple two-wire transmission line have been known, but that the advantages achieved by these two improvements have never been combined.

Accordingly, an object of the present invention is to provide an improved continuous line hydrophone.

Another object of the present invention is to provide a hydrophone streamer comprising linear transducer elements.

Yet another object of the present invention is to provide a hydrophone array in which all hydrophone outputs are coupled to a recorder by a single two-conductor transmission line.

SUMMARY OF THE INVENTION

A hydrophone array according to the present invention comprises a plurality of transmission line segments, which have been sensitized to seismic energy, in combination with electronic circuit means for coupling the segments into a streamer. The electronic circuit means receives seismic frequency signals generated by a first transmission line segment in response to seismic waves and generates a modulated carrier wave signal carrying the seismic frequency signal, and couples this carrier wave signal to a second transmission line segment for transmission along the streamer toward an electronic recording system. The electronic circuit means also receives any carrier waves present on the first transmission line segment and retransmits them on the second transmission line segment, so that the seismic signals from the most distant cable segment are coupled through the entire length of the streamer to the recording system.

BRIEF DESCRIPTION OF THE DRAWINGS

The present invention may be more completely understood by reading the following detailed description of the preferred embodiment with reference to the accompanying drawings, wherein.

DESCRIPTION OF THE PREFERRED EMBODIMENT

Figure 1:
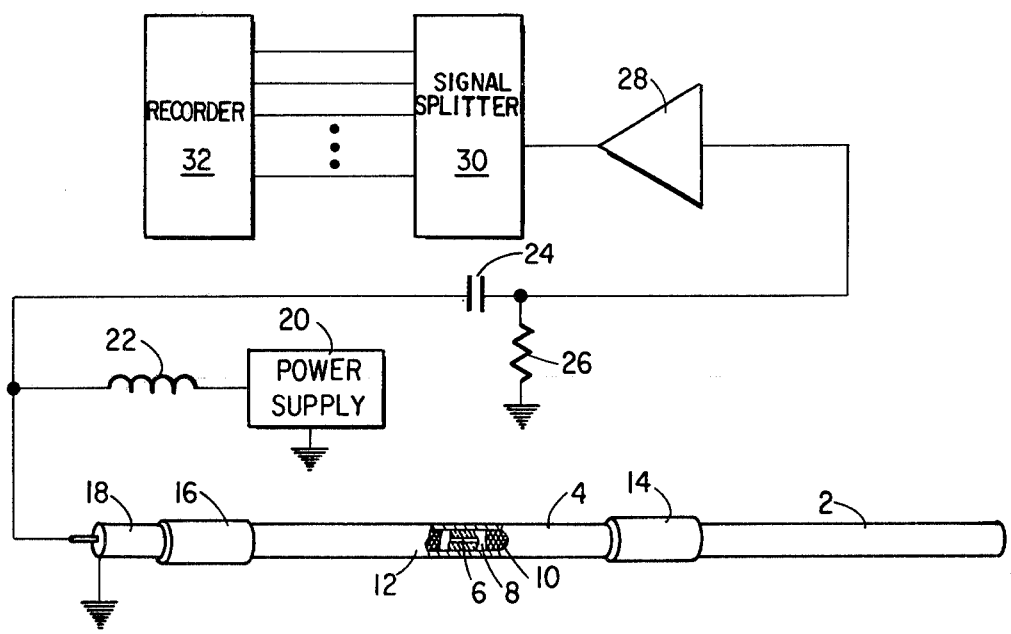
FIG. 1 is a block/schematic diagram of a streamer and seismic recording system according to the present invention.

With reference to FIG. 1, there is shown a streamer comprising continuous line hydrophones and its interconnection with a power supply and recording system. The streamer comprises a plurality of coaxial cable segments, such as segments 2 and 4, of which only two are illustrated to simplify the drawing. These coaxial cable segments are simply lengths of standard coaxial cable having an inner conductor 6, which is surrounded by a dielectric material 8, which, in turn, is surrounded by an outer conductor 10, which is typically a mesh of fine wire strands. The coaxial cables 2 and 4 also have an outer protective rubber cover 12. Cable segments 2 and 4 are made sensitive to seismic waves by being treated in the manner described in U.S. Pat. No. 3,763,482, so that the dielectric material 8 becomes an electret.

Cable segments 2 and 4 are mechanically and electrically coupled together by an electronic circuit module 14. Module 14 receives seismic frequency signals from cable 2 and generates a frequency-modulated carrier wave carrying the seismic signal which it then couples onto cable 4. Electronic module 16 couples cable segment 4 to a section of cable 18, which has not been made responsive to seismic energy. Module 16 receives the seismic frequency signals generated by cable segment 4 and generates a modulated carrier wave, at a frequency different from that of module 14, carrying this signal which it couples onto cable 18. Module 16 also receives the carrier wave generated by module 14, and retransmits this signal on to cable 18. A power supply 20 is coupled through an AC signal blocking inductor 22 to cable 18 for supplying power to modules 14 and 16. Module 16 includes circuitry for coupling part of the power from supply 20 to cable 4 for coupling to module 14. The circuitry and functions of modules 14 and 16 are described in more detail below with reference to FIG. 2.

The carrier wave signals on cable 18 are coupled through a DC blocking capacitor 24 to the input of an amplifier 28. A resistor 26 coupled from the input of amplifier 28 to ground has a resistance equal to the characteristic impedance of transmission line 18 to provide a proper impedance match and prevent reflection of carrier wave signals back onto cable 18. The output of amplifier 28 is coupled to the input of a signal splitter 30, which has a separate output for each electronic circuit module, such as modules 14 and 16. Splitter 30 comprises simply a set of bandpass filters, each tuned to a center frequency corresponding to the carrier wave frequency generated by modules 14 and 16. In addition, each filter is followed by an FM detector. Alternatively, a signal splitter 30 may comprise a set of tuned FM discriminators, such as that disclosed in the above-referenced U.S. Pat. No. 3,239,803. Each output of signal splitter 30 is therefore a reproduction of the seismic frequency outputs of cable segments 2 and 4. In practice, a streamer comprises from 24 to 48 lengths of cable, such as segments 2 and 4, with each segment being from 100 to 300 feet in length. Each of these cable segments has a corresponding circuit module like modules 14 and 16, with each module operating at a separate center frequency.

In operation, the hydrophone assembly of FIG. 1 is essentially the same as that disclosed in the above-referenced U.S. Pat. No. 3,239,803, as far as the method of encoding seismic signals from a plurality of detectors and transmitting them on a single transmission line is concerned. In the present invention, seismic detection occurs over the entire length of a 100- to 300-foot coaxial cable segment, such as segments 2 and 4. Seismic waves impinging upon cable segment 2, for example, generate a corresponding voltage difference between the two conductors comprising cable 2 and electronic module 14 frequency-modulates a carrier wave in direct proportion to this induced voltage. This carrier wave is transmitted along cable 4 to module 16, which repeats the signal from module 14, and retransmits it on cable 18. Module 16 also generates its own signal representative of the seismic energy impinging upon cable segment 4, and adds this to the signal which it transmits on the cable 18. The signal on cable 18 is therefore the sum of all the signals generated by electronic modules such as modules 14 and 16. These signals are coupled through capacitor 24 to wideband amplifier 28, which amplifies the signals and provides low output impedance for driving the input of signal splitter 30. Signal splitter 30 sorts out all the signals and provides one output for each transmission line segment to the recorder 32 so that the signals are individually recorded for later use.

Figure 2:
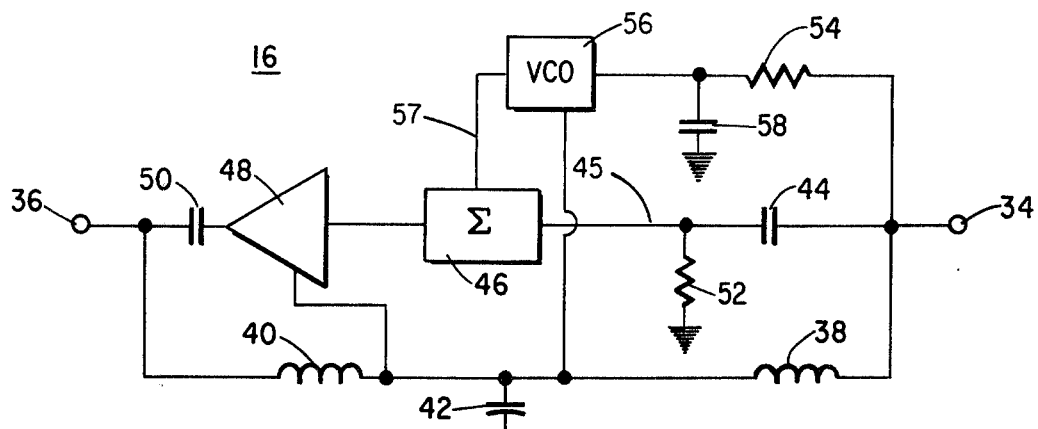
FIG. 2 is a schematic diagram of electronic circuitry for interconnecting the transmission line segments of FIG. 1.

FIG. 2 illustrates the circuitry contained within electronic module 16 of FIG. 1. Module 16 has an input 34 coupled to the center conductor of cable 4 and has an output 36 connected to the center conductor of cable 18. Module 16 has essentially three circuit paths between input 34 and output 36. Inductors 38 and 40 are connected in series between output 36 and input 34 to form a DC short circuit between input 34 and output 36 to allow DC power to pass through module 16. A capacitor 42 is connected from the junction of inductors 38 and 40 to ground so that inductors 38 and 40 and capacitor 42 also form a DC power supply filter. Carrier frequency signals pass from input 34 through capacitor 44 to an input 45 of a summer 46. The output of summer 46 is coupled to the input of a carrier frequency amplifier 48, which couples signals through capacitor 50 to output 36. A resistor 52 is coupled from input 45 of summer 46 to ground to provide a matched impedance load for transmission line 4, which is coupled to input 34. Seismic frequency signals are coupled from input 34 through resistor 54 to a control input of a voltage-controlled oscillator 56. A capacitor 58 is coupled from the control input of VCO 56 to ground to prevent carrier frequency signals from reaching this input of VCO 56. VCO 56 is also coupled to the junction of inductors 38 and 40 from which it draws required DC power. VCO 56 is a crystal-controlled oscillator, whose frequency is varied about the crystal resonant frequency by the voltage which is coupled to its control input from input 34. The output of VCO 56 is coupled to a second input 57 of summer 46, which adds this carrier frequency signal with that coupled to summer input 45, and couples this sum to the input of amplifier 48. Summer 46 is a simple resistive summing network, as is commonly used as an input to an operational amplifier. Amplifier 48 is also coupled to the junction of inductors 38 and 40 from which it draws the DC power necessary to transmit the signals it receives to cable 18, which is coupled to output 36.

As stated above, a streamer according to the present invention includes typically from 24 to 48 cable segments each with its own electronic module. It is apparent that all but one of these modules contains all the circuitry shown in FIG. 2. The one which differ is the last module in the streamer, that is the one farthest from the tape recording system, and this is illustrated as module 14 in FIG. 1. Module 14 does not contain inductor 40, capacitor 44, resistor 52, and summer 46, which are shown in FIG. 2 as part of module 16. The output of VCO 56 is connected directly to the input of line driver amplifier 48. Capacitor 58 is also not absolutely necessary to remove carrier wave signals since there is no electronic module beyond module 14 which is transmitting carrier wave signals onto cable 2, but is retained in module 14 to remove other noises which may occur on cable 2. The elements which are eliminated are needed only in modules which must couple DC power to modules farther down the streamer and which must receive and retransmit carrier waves generated farther down the streamer. It may be more practical in practice to include all the elements illustrated in FIG. 2 in module 14 of FIG. 1, to avoid confusion in field operations.

The filter network comprising inductors 38 and 40 and capacitor 42 is a high-cut filter having a breakpoint below the minimum seismic frequency of interest. In the marine streamer application of the preferred embodiment the minimum frequency of interest is about 20 hertz, and a filter cutoff frequency of approximately 10 hertz is acceptable. If lower cutoff frequencies are required in other applications, it may prove more practical to use batteries in each module to supply power and low-power circuitry so that the batteries would not need to be replaced too often. The carrier frequency range of the preferred embodiment is from 500 to 600 kilohertz due to the availability of oscillator crystals within this range. A much wider range of frequencies may be used as long as the lower limit is sufficiently above the highest seismic frequency of interest to allow separation of these signals by simple RC filter techniques. Capacitors 44 and 50 are therefore chosen to pass the lowest carrier frequency but to block all seismic frequencies of interest. Capacitor 58 is selected so that the high-cut filter which it forms in combination with resistor 54 has a breakpoint sufficiently above the highest seismic frequency of interest to pass all the seismic information with essentially no attenuation or phase shift, but to prevent the passage of any carrier wave signals to the control input of VCO 56. Since, in marine operations, the seismic frequency band is historically limited to 20 to 50 hertz, capacitor 58 can be chosen to provide a cutoff at 500 hertz, and thus not affect the seismic signals while preventing any carrier wave signals from reaching VCO 56. It is apparent that if the streamer of the preferred embodiment is used in dry-land applications, or if the marine seismic frequency range of interest is expanded, that the frequency responses of these components may be adjusted accordingly.

Figure 3:
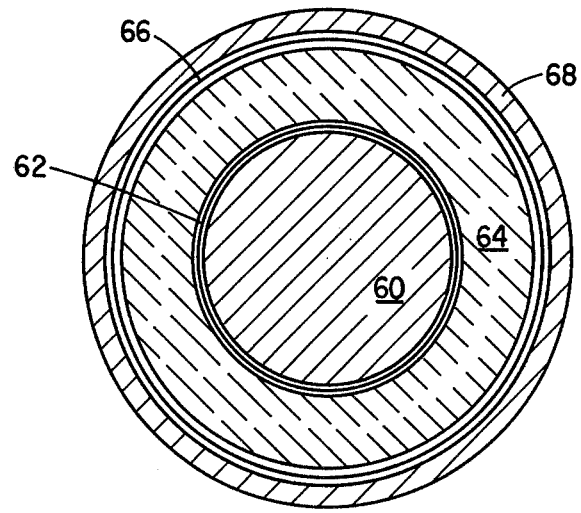
FIG. 3 is a cross-sectional view of a neutral buoyancy coaxial cable for use with the present invention.

In FIG. 3, there is shown a cross-sectional view of a modified coaxial cable designed to be neutrally buoyant in sea water. This modified cable includes a central core 60 of a foamed flotation material, such as a foamed urethane plastic. A cylindrical conductor 62 surrounds the central core 60 and may be formed from a wire mesh material, such as the outer conductor 10 of cable 4 in FIG. 1. The cylindrical conductor 62 is surrounded by a layer 64 of a suitable dielectric, such as tetrafluorethylene, which is sold under the trademark "Teflon," by E. I. duPont de Nemeurs & Company. An outer conductor 66 surrounds the dielectric layer 64 and may also be a mesh-type of material. An outer protective layer of rubber 68 surrounds conductor 66. One or both of the conductors 62 and 66 contains strands which run the length of the cable parallel to the cable axis. These strands are to provide axial strength in the cable and to prevent stretching when a long length of the cable, for example, 1 mile, is towed through water or possibly pulled along a dry land surface.

The use of a frequency-modulated carrier telemetry system in this preferred embodiment is not intended as a limitation. An obvious alternative is the use of amplitude-modulated carrier waves, but the frequency-modulated method is preferred to reduce the noise in the signal and to prevent the amplitude modulation of carrier waves being transmitted through the cable by seismic waves impinging upon the cable along its entire length. Another alternative is to sample and digitize the seismic information at each electronic module and to transmit the samples on a time-shared basis along the cable. Digital sampling and recording systems have become standard equipment in the geophysical surveying field and this alternative would therefore interface more easily with this type of equipment. The digital approach would also simplify or eliminate the signal splitter 30 of FIG. 1 since the time-shared digital signal cound simply be switched digitally to different inputs of the recorder system on a time-shared basis, or the time-shared signal could simply be recorded serially and separated later by the computer which processes the recorded data.

It is apparent that other modifications and changes may be made in the disclosed apparatus without departing from the spirit and scope of the present invention as defined by the appended claims.

We claim:
1. A hydrophone streamer comprising:
a plurality of transmission line segments, each segment comprising at least two conductors and a dielectric spacer between said conductors, wherein said transmission line has capacitance between said conductors which varies in response to acoustic waves which impinge upon the transmission line, and wherein a voltage change is generated between said conductors proportional to said capacitance change; and
electronic circuit means for coupling two or more of said transmission line segments into a linear array of said segments, said circuit means comprising a voltage controlled oscillator coupled to a first of said segments for generating a carrier wave signal having a characteristic modulated by said voltage change and for coupling the modulated carrier signal to a second segment.
2. A hydrophone streamer according to claim 1 wherein said dielectric spacer is an electret having a permanent static charge within.
3. A hydrophone streamer according to claim 1 further including within said electronic circuit means a carrier wave coupling means coupled to said first segment for receiving carrier wave signals therefrom and coupled to said second segment for retransmitting said received carrier wave signals onto said second segment.
4. A hydrophone streamer according to claim 1 wherein said voltage-controlled oscillator generates a carrier wave which is frequency modulated by the voltage change.
5. A hydrophone streamer according to claim 1 wherein said voltage-controlled oscillator generates a carrier wave which is amplitude modulated by said voltage change.
6. A streamer according to claim 1 wherein the transmission line segments are of the coaxial type and wherein the center conductor of said coaxial cable is a cylinder of conductive material which is filled with a foamed plastic whereby the segments have neutral buoyancy in water.
7. A hydrophone streamer for use in geophysical prospecting comprising:
a plurality of coaxial transmission line segments having a dielectric between an inner and outer conduc- tor which has been treated to form an electret which generates a voltage between the inner and outer conductors in response to seismic waves which impinge upon the cable segment; and one or more electronic modules for coupling the transmission line segments into a linear array, wherein each module has an input for receiving seismic frequency and carrier wave frequency signals from a first transmission line segment and an output for retransmitting said carrier wave frequency signals and for transmitting a carrier wave signal carrying a representation of the seismic frequency signals received from said first segment onto a second transmission line segment.

8. A streamer according to claim 7 wherein each electronic module generates carrier waves having a carrier frequency different from all other modules in said streamer.

9. A streamer according to claim 7 wherein said electronic modules generate frequency-modulated carrier wave signals.

10. A streamer according to claim 7 wherein the center conductor of said coaxial transmission line segments is a cylinder of conductive material which is filled with a foamed plastic whereby the segments have neutral buoyancy in water.

11. A streamer according to claim 7 wherein said electronic modules further include means for coupling DC power from said second transmission line segment to said first transmission line segment.

12. In a marine streamer, the use of a transmission line segment having at least two conductors and a dielectric separating the conductors wherein said dielectric has a static electrical charge permanently stored therein, said use comprising the simultaneous conversion of seismic energy impinging upon said segment into an electrical signal to be detected on said conductors and transmission of modulated carrier wave signals representative of electrical signals generated by other separate and distinct detectors which form a part of said streamer.

13. In marine geophysical exploration of the type wherein a ship tows a streamer having a plurality of seismic detectors attached in a linear array to a cable and means for coupling electrical outputs from said detectors to recording equipment carried on the ship, the method comprising:

detecting seismic energy by means of a distinct transmission line segment comprising at least two conductors separated by a dielectric which has a static electrical charge permanently stored therein, said transmission line segment forming a part of the length of said streamer; and simultaneously transmitting a carrier wave signal representative of outputs of other seismic detectors along said transmission line segment toward the recording equipment carried on the ship.

* * * * *